United States Patent [19]
Williams

[11] Patent Number: 5,815,794
[45] Date of Patent: Sep. 29, 1998

[54] UNDESIRABLE ENERGY SUPPRESSION SYSTEM IN THE RETURN PATH OF A BIDIRECTIONAL CABLE NETWORK HAVING DYNAMICALLY ALLOCATED TIME SLOTS

[75] Inventor: Thomas H. Williams, Longmont, Colo.

[73] Assignee: Cable Television Laboratories, Inc., Louisville, Colo.

[21] Appl. No.: 522,630

[22] Filed: Sep. 1, 1995

[51] Int. Cl.⁶ .................................................. H04N 7/173
[52] U.S. Cl. ............................................. 455/5.1; 348/12
[58] Field of Search .................................. 348/12, 13, 6, 348/7, 8, 9, 10, 11, 14, 15, 16, 17, 18; 455/5.1, 6.1, 6.2, 6.3, 4.2; H04N 7/16, 7/173

[56] References Cited

U.S. PATENT DOCUMENTS

| | | | |
|---|---|---|---|
| 3,924,187 | 12/1975 | Dormans | 455/4.1 |
| 4,002,843 | 1/1977 | Rackman | 455/5.1 |
| 5,481,542 | 1/1996 | Logston et al. | 348/13 |
| 5,499,047 | 3/1996 | Terry et al. | 348/6 |
| 5,570,347 | 10/1996 | Bestler et al. | 348/12 |
| 5,572,517 | 11/1996 | Safadi | 370/50 |
| 5,606,725 | 2/1997 | Hart | 348/12 |

*Primary Examiner*—Christopher C. Grant
*Attorney, Agent, or Firm*—Duft, Graziano & Forest, P.C

[57] ABSTRACT

A bidirectional cable network having a signal distribution system that prevents undesirable energy in the bidirectional cable network's return path from adversely effecting the entire network. The signal distribution system a first signal transmitted in a forward path direction over the bidirectional communication path from a headend to a plurality of remote points. Signals transmitted in a return path direction are time division multiplexed on a series of cyclically reoccurring time slots where at least one of the cyclically reoccurring time slots is assigned to each of the plurality of remote points. At least one primary return gate is effective during each occurrence of the cyclically reoccurring time slots for isolating all of the plurality of remote points from accessing the network to transmit a signal in second direction except for the one of the plurality of remote points which is assigned the cyclically reoccurring time slot that is presently providing a path to transmit in the second direction from the remote point to the headend. In one embodiment each return gate services a plurality of remote points within the return gate's distribution branch. In a second embodiment each remote point has a dedicated return gate.

25 Claims, 8 Drawing Sheets

FIG. 8

UNDESIRABLE ENERGY SUPPRESSION SYSTEM IN THE RETURN PATH OF A BIDIRECTIONAL CABLE NETWORK HAVING DYNAMICALLY ALLOCATED TIME SLOTS

FIELD OF THE INVENTION

This invention relates to bidirectional cable networks, and more particularly, to a signal distribution system that prevents undesirable energy in the bidirectional cable network's return path from adversely affecting the network.

PROBLEM

Existing cable network plants typically include a bidirectional communication path capability between a network headend and each remote point in the network. A network headend is the collection/origination point for forward path signals into the network and the collection/termination point for return path signals from the network, where the collection point and termination point may not necessarily be the same physical location. A shared wire implementation of a bidirectional communication path is typically a single coaxial cable that simultaneously carries broadband radio frequency (RF) signals in two directions on the same cable by dividing the frequency spectrm of the bidirectional communication path. The frequency spectrum is divided into a first frequency range for carrying signals in a first "downstream" or "forward path" direction from a headend signal source to a plurality of remote points, and a second frequency range for carrying signals in a second "upstream" or "return path" direction from each remote point to the headend. For example, a bidirectional communication path might include a first frequency range at or about 54–750 MHz for carrying signals in the forward path direction and a second frequency range at or about 5–40 MHz for carrying signals in the return path direction.

One technical challenge in operating a network having a bidirectional communication path on a shared wire between the headend and each remote point, is maintaining good network integrity for signals being transmitted in the forward path and return path directions. Signals transmitted in the forward path direction from the headend to the remote points enjoy good network integrity because the headend delivers a high quality signal from a controlled source environment. The headend's high quality signal is clearly distinguishable from the noise floor and other undesirable energy. However, signals trasmitted in the return path direction from any one remote point to the headend are often not of high quality and can be severely impaired because a remote point is typically an uncontrolled noise producing environment such as a private home. In addition, the remote point is often the network point having an unshielded, improperly connected, or inadvertently cut cable. A private home is considered a potential noise producing environment because it contains multiple entry/origination points for undesirable energy on the bidirectional communication path for reasons including, but not limited to, inadequate house wiring and/or shield integrity, inadequate grounding, inadequately shielded electrical devices, and imprecise transmission equipment. Noise and other undesirable energy originating at one remote point or at any point along the return path from that remote point can impair network communications for all remote points in the network Similarly, where noise and undesirable energy from one remote point is combined with noise and undesirable energy from other remote points in the network, network communications are impaired.

Undesirable energy, often loosely refeffed to generically as "noise," occurs in many forms including, but not limited to, Gaussian noise, ingress energy, and common path distortion to name a few major types.

Gaussian noise, also called white noise, is the random noise that forms the relatively constant noise floor that crosses all frequencies in the frequency spectrum of a communication path. Gaussian noise components include naturally occurring thermal noise that is related to temperature, shot noise created by active electrical or electromechanical devices, and other low frequency energy sources. This Gaussian noise forms a noise floor power level which at any given time defines the noise level that a desired RF carrier must exceed to achieve a clearly recognizable signal in a given frequency band.

Ingress is unwanted energy that enters a communication path from a source external to the communication path. Ingress presents one of the greatest problems in a network because the unwanted signal is often an impulse noise that enters the network at a weak point in the network. Weak points in the network are all too often at or near a remote point where there is a shield discontinuity, improperly grounded electrical device, or a faulty connector. Radio frequency carriers from shortwave radio, citizen's band radio, or other broadcast sources may also enter the network at these weak points and cause interference peaks at specific carrier frequencies in the communication path. Another ingress source is impulse noise consisting of high power short duration energy pulses. The high power energy pulse results in a significant rise in the noise floor while the short duration results in an elusive disruption whose source or entry point into the network is difficult to pinpoint.

Common path distortion is the result of nonlinearities in a network due to physical connector corrosion creating point contact diodes. The effect of these diodes in the return path are triple power peaks at regular 6 MHz intervals in the frequency spectrum.

Regardless of the undesirable energy source, the combination or summation of undesirable energy throughout a network is called "funneling" or the "funneling effect". The funneling effect is particularly disruptive because the net noise floor power level is compounded as undesirable energy from multiple sources are combined at directional couplers along the return path to the headend. For these reasons, there is an existing need for the ability to manage undesirable energy and prevent such energy from disrupting network integrity. The solution must also avoid compromising network integrity or capacity along the bidirectional communication path. A cost-effective solution to this problem has not been realized prior to the solution disclosed herein.

SOLUTION

The above described problems are solved and a technical advance achieved in the field by the signal distribution system of the present invention. The signal distribution system enables bidirectional signal exchanges in a network having a bidirectional communication path between a headend and a plurality of remote points in the network. The signal distribution system comprises a means for enabling the plurality of remote points to receive a first signal transmitted in a forward path direction over the bidirectional communication path from the headend to the plurality of remote points. For signals transmitted in a return path direction over the bidirectional communication path from each of the plurality of remote points to the headend, a series of cyclically reoccurring time slots is defined and at least one of the cyclically reoccurring time slots is assigned to each of the plurality of remote points. The signal distribution system enables any of the plurality of remote points to transmit a signal in the return path direction over the bidirectional communication path from the plurality of remote points to the headend during each occurrence of one of the cyclically reoccurring time slots to which each of the plurality of remote points is assigned. To prevent unwanted signals from propagating throughout the network, a return gate is effective during each occurrence of the cyclically reoccurring time slots for isolating all of the plurality of remote points from accessing the network thereby preventing the plurality of remote points from transmitting a signal in the second direction except for the one of the plurality of remote points which is assigned the cyclically reoccurring time slot presently being provided a closed path to transmit in the second direction.

The plurality of cyclically reoccurring time slots include a series of frames comprising a polling frame, an optional network monitoring frame, and a plurality of data frames. The polling frame is for transmitting a service initiation request from a remote point to the headend. The network monitoring frame is for monitoring each of the plurality of remote points for interference on the bidirectional communication path. The plurality of data frames each contain a plurality of data time slots for transmitting signals in the second direction from the plurality of remote points to the headend.

The return gate is a time division switch that serves all the remote points in a branch of a tree style trunk and branch cable network. The return gate opens and closes to break and reconnect the return path direction of the bidirectional communication path with the occurrence of each of the cyclically reoccurring time slots. The opening and closing of the return gate is synchronized with the headend and each of the plurality of remote points being served by the return gate to facilitate the time division multiplexing of return path transmissions from the plurality of remote points sharing the return path. Each of the plurality of remote points knows when to transmit and in which time slot to transmit because the necessary timing reference information and time slot assignment information is made available from the headend over the forward path of the bidirectional communication path.

When a return gate is open the return path is broken and the remote points in the distribution branch are prevented from transmitting on the return path. Preventing the remote points from transmitting on the return path prevents unwanted and uncontrolled ingressing signals from entering the network. When a return gate is closed the return path is reconnected so that the remote point that is assigned the present time slot can transmit to the headend while all other remote points remain silent and await their assigned time slot. If the unwanted and uncontrolled ingressing signal of one remote point is present on the return path at the time the return gate closes for another remote point's assigned time slot, the unwanted ingressing signal will pass through the return gate for the brief fraction of time the return gate is closed. However, the return gate will open again at the end of the time slot and prevent the unwanted ingressing signal from continuing to transmit toward the headend and corrupting the network beyond the return gate. The portion of a network between the return gate and the headend is known as the clean part of the network. The portion of a network between the return gate and the remote point is known as the dirty part of a network.

In one embodiment, individual return gates are located where each can serve an entire distribution branch of remote points in the bidirectional cable network. In a second embodiment, there is a return gate dedicated to each individual remote point. The second embodiment may also include a forward gate dedicated to each individual remote point to cutoff and reconnect the forward path signal for a selected remote point.

DETAILED DESCRIPTION

Figure 1:
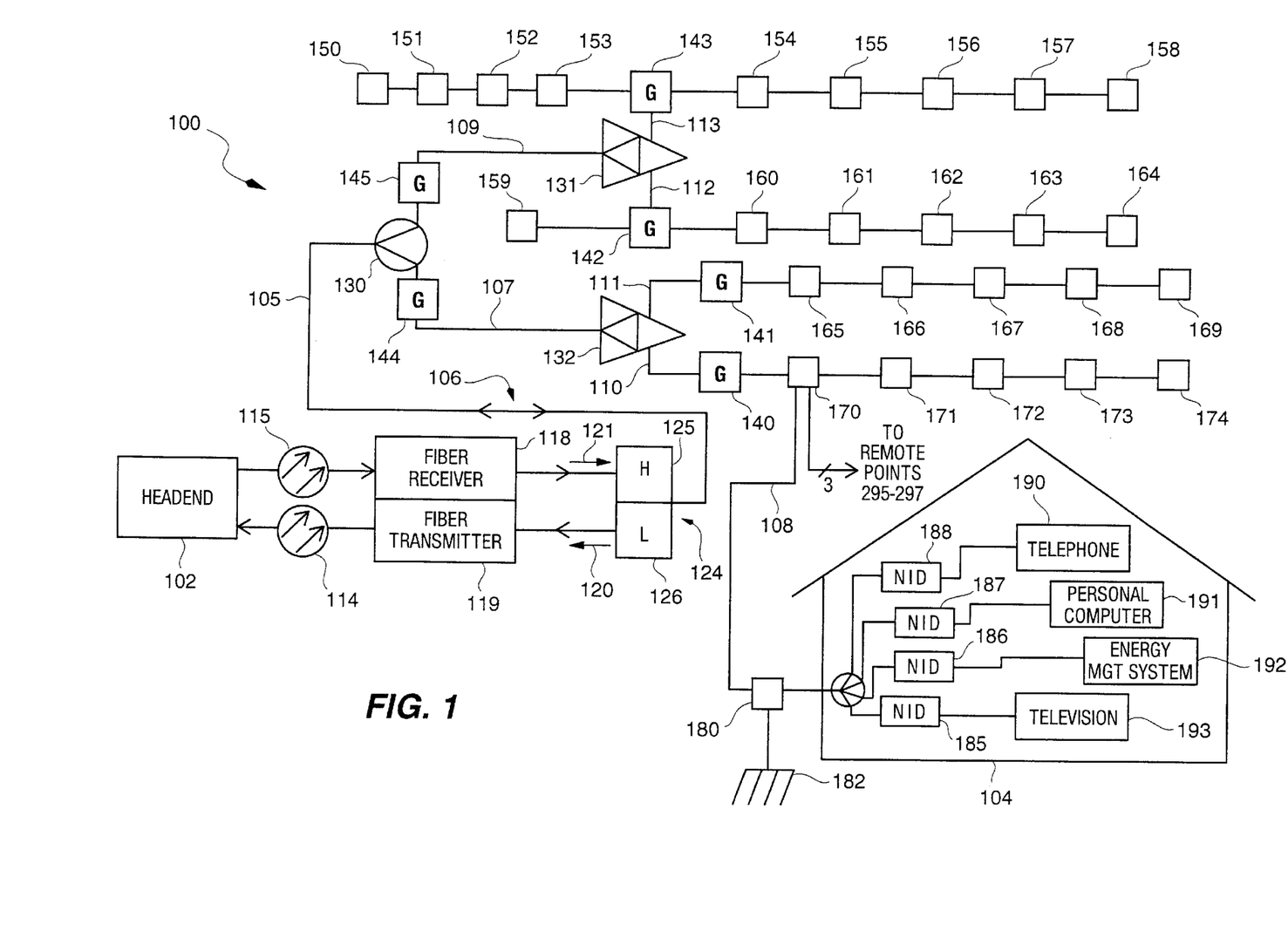
FIG. 1 illustrates a bidirectional cable network including a headend, a return gate device, and a remote point in block diagram form.

Bidirectional Cable Network—FIG. 1

FIG. 1 illustrates the primary components of a bidirectional cable network 100 which is a hybrid fiber-coax tree-and-branch network topology commonly found in the industry. The bidirectional cable network 100 includes a headend 102 and at least one remote point 104 having a bidirectional communication path 106 therebetween. Headend 102 is also known as a distribution hub. The tree-and-branch network topology is illustrated in FIG. 1 by a primary trunk 105 that branches into secondary trunks 107 and 109 which branch into distribution branches 110–113 and finally individual drop lines such as drop line 108.

Each distribution branch 110–113 contains a plurality of network taps 150–174 that each provide a plurality of drop line cables such as drop line 108 that connects remote point 104 to distribution branch 110. A single network tap 170, for example, typically supports 2, 4 or 8 drop lines to a number of remote points. A network tap is well known and available in the cable industry and typically includes a first directional coupler to tap the distribution branch cable, a second directional coupler to produce the desired number of drop lines exiting the network tap, and an optional power passing circuit to jump the first directional coupler so that power can be delivered to other active devices. For simplicity in the FIG. 1 discussion, although network tap 170 can support multiple drop lines only one drop line 108 is illustrated to connect remote point 104 to distribution branch 110.

The bidirectional communication path 106 is a single physical cable that simultaneously carries broadband radio frequency (RF) signals in both directions between the headend 102 and a plurality of remote points such as remote point 104. Simultaneous bidirectional communication on a single physical wire is accomplished by dividing the RF spectrum into a first frequency range and a second frequency range. The first frequency range carries signals in a first "downstream" or "forward path" direction 121 from the headend 102 signal source to each of a plurality of remote points such as remote point 104. The second frequency range carries signals in a second "upstream" or "return path"

direction 120 from each remote point, such as remote point 104, back to headend 102. For example, a typical bidirectional communication path 106 might include a first frequency range at or about 54–750 MHz for carrying signals in the forward path direction 121 and a second frequency range at or about 5–40 MHz for carrying signals in the return path direction 120.

Bidirectional communication path 106 can be a coaxial cable, fiber optic cable, or a hybrid fiber-coax system, all which are commonly used and available in the industry. FIG. 1 illustrates a hybrid fiber-coax network where a fiber optic cable extends from headend 102 through fiber optic forward cable 115 and fiber optic return cable 114, and fiber receiver and transmitter 118 and 119 using apparatus commonly known and available in the cable industry. Coaxial cable is regularly used in portions of the network nearer the distribution branches 110–113 toward the remote points 104 and 195–197. Diplex filter 124 filters and joins the first and second frequency ranges in bidirectional communication path 106 onto a single physical cable. The filtering is accomplished with high-pass filter 125 for the first high frequency range, and low-pass filter 126 for the second low frequency range. Diplex filters are well known and available in the cable industry.

Remote point 104 is connected to distribution branch 110 at network tap 170 by way of drop line 108. Drop line 108 is grounded at ground block 180 by an earth ground 182 to protect the network 100 and remote point 104 from lightning strikes. Drop line 108 terminates at Network Interface Devices (NID) 185–188. Each NID 185–188 is the network interface for a piece of terminal equipment 190–193 located in remote point 104. NID 185–188 details are discussed in further detail in the text accompanying FIG. 4. Types of terminal equipment 190–193 can include, but are not limited to, voice, data, and/or video telephone equipment 190, personal computing equipment 191, energy management equipment 192 for heating/cooling systems and/or utility service meters, and television equipment 193. User/subscriber's that do not wish to replace their traditional Set Top Box (STB) with NID 185 are fully supported by the signal distribution system of the present invention as discussed in the text accompanying FIG. 5–6.

Directional coupler 130 is a commonly used device that splits and joins branches in the bidirectional cable network 100. For example, directional coupler 130 splits primary trunk 105 into secondary trunks 107 and 109 so that both secondary trunks 107 and 109 contain all forward information. Similarly, directional coupler 130 joins secondary trunks 107 and 109 into primary trunk 105. Directional couplers can also include an amplifier or repeater depending on the distance between the directional coupler and the headend 102. Amplifiers that also contain directional couplers are illustrated by directional coupler/amplifiers 131–132.

Return gate devices 140–145 contain return gate control circuitry and the return gate necessary to facilitate unrestricted signal flow in the forward path direction 121 and time division multiplexed signal flow in the return path direction 120. Return gate devices are ideally located in primary and secondary positions within bidirectional cable network 100. Because a single return gate device 140 can only suppress unwanted energy that enters the return path in the remote point side of the return path, a secondary return gate device 144 provides an additional suppression point further toward the headend from primary return gate device 140. Therefore, not only do return gate devices 140–145 provide the return gate apparatus for intermittently isolating the respective distribution branches except to allow time division multiplexed return path signals to pass, any return gate device 140–145 can be used to continuously isolate its respective distribution branch if unwanted energy originating from a remote point on the branch is so severe so as to threaten network integrity throughout bidirectional cable network 100.

Figure 2:
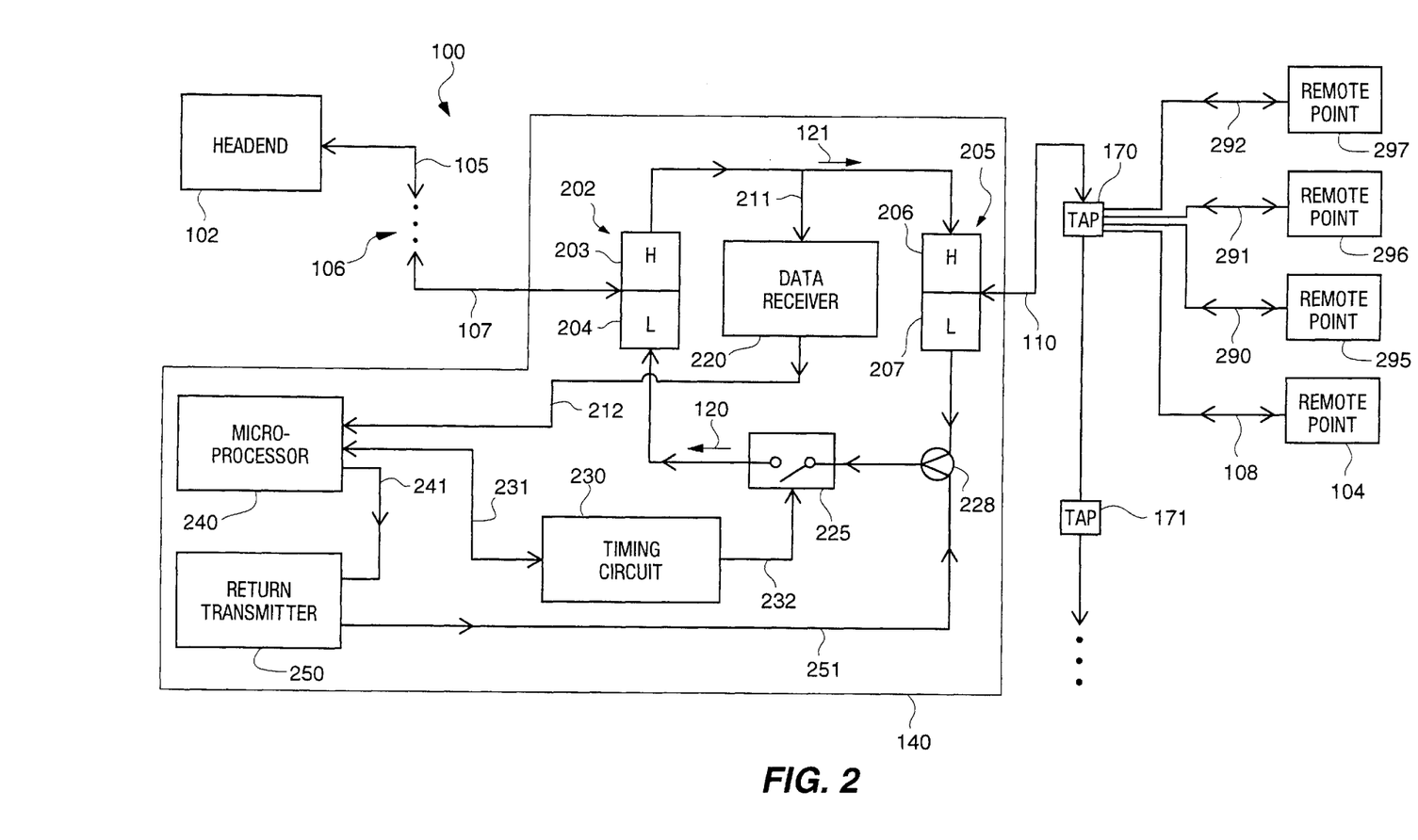
FIG. 2 illustrates a first return gate device embodiment in block diagram form.

Return Gate Embodiment—FIG. 2

FIG. 2 illustrates the details of a return gate as can be found in any of the return gate devices 140–145. There is no functional difference between a return gate device located in a primary, secondary, or any other position in bidirectional cable network 100. Return gate device 140 is connected to headend 102 by way of primary trunk 105 and secondary trunk 107 portions of bidirectional communication path 106. Return gate device 140 is connected to network taps 170–171 by way of distribution branch 110. Network tap 170 illustrates the drop line connectivity to a plurality of individual remote points 104 and 295–297 by way of drop lines 108 and 290–292. Each remote point 104 and 295–297 believes that it has an intermittent or switched point-to-point connection with headend 102. Return gate device 140 contains individual components that are well known and available in the cable industry. Power for return gate 140 is typically 60 volt 60 cycle power taken from the lowest frequency bands of a coaxial cable based bidirectional communication path 106. The return gate device 140 is also designed to withstand hostile outdoor environmental factors including, but not limited to, temperature, humidity, and lightning strikes, in any manner well known and practiced in the cable industry.

The headend 102 side of bidirectional communication path 106 enters return gate device 140 at diplex filter 202. Forward path 121 is separated from bidirectional communication path 106 by high-pass filter 203. Data receiver input line 211 taps the forward path 121 on behalf of data receiver 220 so that time division multiplexing administrative information can be extracted for use by return gate device 140 and timing data or pulses. Time division multiplexing administrative information includes, but is not limited to, timing signals, remote point time slot assignments, global network commands, and commands related to specific remote points 104 or 295–297. Data on forward path 121 can be modulated on the forward path carriers as Frequency-Shift Keyed (FSK) data, and timing information can be Amplitude Modulated (AM) pulses on the forward path 121 or the data may use a totally digital method such as VSB or QAM. The forward path 121 rejoins bidirectional communication path 106 by way of high-pass filter 206 of the diplex filter 205. The bidirectional output of diplex filter 205 is the distribution branch 110 which delivers the bidirectional communication path 106 to the network taps 170–171. Network tap 170 provides bidirectional drop line 108 and 290–292 connections to remote points 104 and 295–297.

The return path 120 portion of distribution branch 110 is separated by low-pass filter 207 of diplex filter 205 and becomes the first of two inputs to directional coupler 228. The second input to directional coupler 228 is the return transmitter output 251 from return transmitter 250. The return path 120 output from directional coupler 228 passes through the single pole single throw gate 225 and rejoins bidirectional communication path 106 by way of low-pass filter 204 of the diplex filter 202. Return gate 225 opens and closes to accomplish the time division multiplexed return path scheme at the timing direction of timing circuit 230. The timing signal from timing circuit 230 is delivered by timing control lead 232.

Timing circuit 230 receives timing and general control information from microprocessor 240 by way of communication lead 231. Microprocessor 240 contains the operating system that controls all components and activities of the return gate device 140. Specific microprocessor 240 functions include, but are not limited to, managing remote point address information, responding to headend 102 commands, testing return gate 225 isolation capability, testing power levels on the forward and return paths 121 and 120, and report the status monitoring of the return gate device 140. Testing the isolation of return gate 225 includes instructing timing circuit 230 to hold return gate 225 open while return transmitter 250 transmits a test signal on return transmitter lead 251. Testing power levels in the system helps identify and locate breaks or bad connections in the network.

Return transmitter 250 is used to prepare and transmit diagnostic signals and/or administrative messages to the headend 102 by way of return transmitter lead 251, return gate 225, and return path 120. Return transmitter 250 is used as needed for return gate device 140 administrative communication purposes or for return gate isolation testing as previously discussed.

The advantage of the return gate device 140 embodiment in FIG. 2 is that a single return gate 225 can provide testing and time division multiplexing service to all remote points within the return gate's distribution branch. In the present illustration, the distribution branch of return gate 140 includes distribution branch 110 and any network tap and remote point connected thereto. The disadvantage, however, is that if one remote point in distribution branch 110 begins uncontrolled transmitting or otherwise is the source of undesirable energy on return path 120, all remote points on the distribution branch can be adversely affected. However, it will be known at the headend 102 that the source of the problem is in the distribution branch of the return gate device 140.

Figure 3:
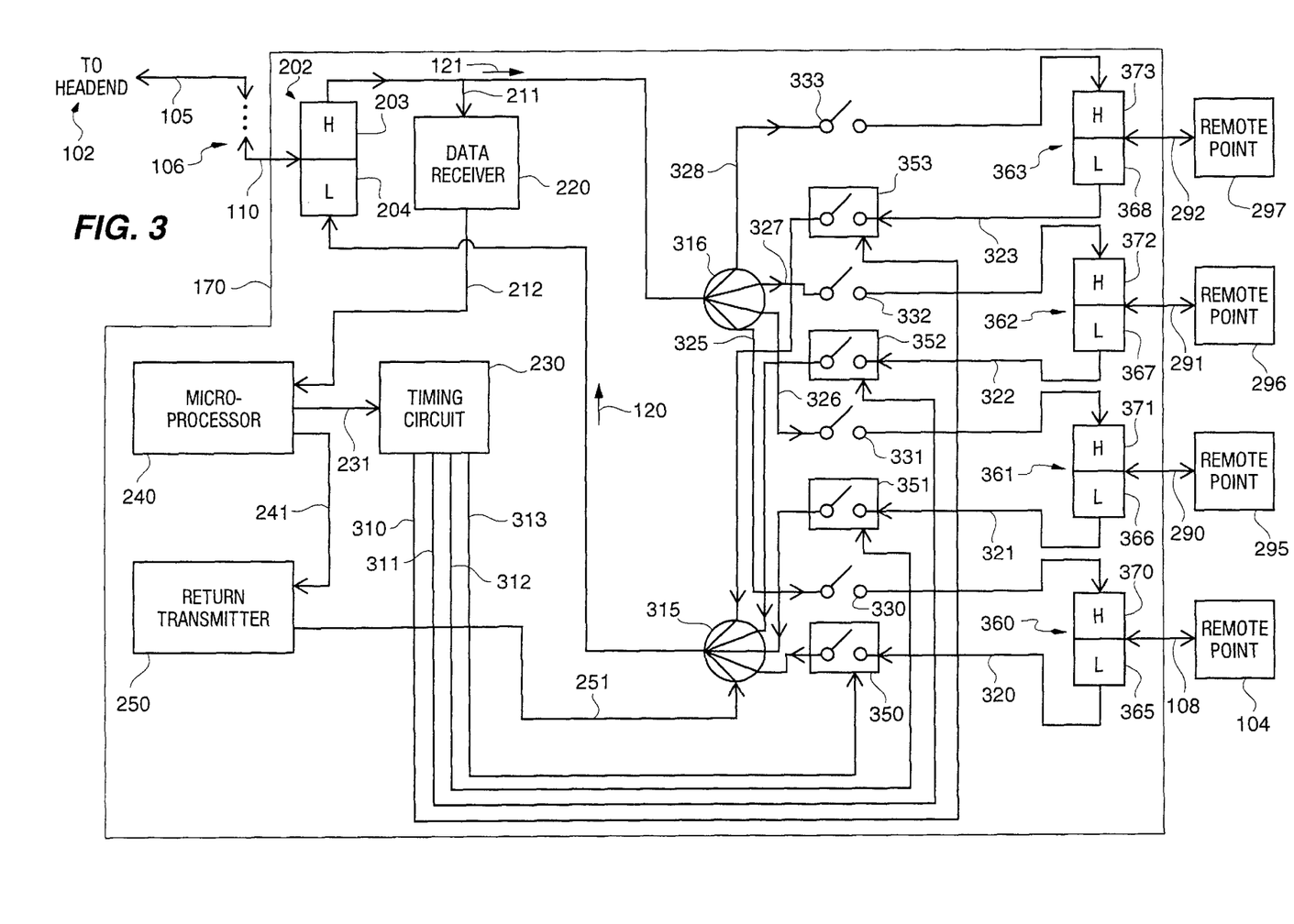
FIG. 3 illustrates a second return gate device embodiment in block diagram form.

Return Gate Embodiment—FIG. 3

FIG. 3 illustrates the details of a return gate embodiment where there is a return gate dedicated to each individual remote point. The FIG. 3 embodiment can be implemented in place of return gate devices 140–143 of FIG. 1 or in conjunction with any combination of the return gate devices 140–145. Central to the FIG. 3 embodiment is that there is a dedicated return gate 350–353 for each drop line 108 and 290–292 to each remote point 104 and 295–297 respectively. In addition, each single pole single throw return gate 350–353, the return gate control components 220, 230, 240, and 250, and related circuitry in FIG. 3 are located within each network tap such as network tap and return gate device 170 which serves remote points 104 and 295–297 by way of drop lines 108 and 290–292. Each of the previously mentioned return gate device 170 components are widely used and readily available in the cable industry.

Return gate device 170 is connected to distribution branch 110 as previously illustrated in FIG. 1 and 2. Power for return gate device 170 is typically 60 volt 60 cycle power taken from the lowest frequency bands of a coaxial cable based bidirectional communication path 106. As with all return gate devices, return gate device 170 is designed to withstand hostile outdoor environmental factors including, but not limited to, temperature, humidity, and lightning strikes, in any manner well known and practiced in the cable industry.

The forward path 121 signal from the headend 102 side of bidirectional communication path 106 enters return gate device 170 at diplex filter 202. Forward path 121 is separated from bidirectional communication path 106 by high-pass filter 203. Data receiver input line 211 taps the forward path 121 on behalf of data receiver 220 so that time division multiplexing administrative information can be extracted for use by return gate device 170. Time division multiplexing administrative information includes, but is not limited to, timing signals, remote point time slot assignments, global network commands, and commands related to specific remote points 104 or 295–297. Data on forward path 121 can be modulated on the forward path carriers as Frequency-Shift Keyed (FSK) data, and timing information can be Amplitude Modulated (AM) pulses on the forward path 121 or all-digital modulation such as VSB or QAM may be used. The forward path 121 is split four ways by directional coupler 316 into forward paths 325–328. Forward paths 325–328 each have a forward path connect/disconnect gate 330–333 which is controlled by the headend 102 to connect or disconnect service to individual remote points 104 and 295–297 without requiring an on site service person call. Each forward path 325–328 rejoins its respective bidirectional drop line 108 and 290–292 by way of high-pass filters 370–373 of the diplex filters 360–363. The bidirectional drop lines 108 and 290–292 connect each remote point 104 and 295–297 to the network so that each remote point 104 and 295–297 believes it has a switched/multiplexed point-to-point connection to headend 102.

The return path 320–323 portion of drop lines 108 and 290–292 are separated from drop lines 108 and 290–292 by low-pass filters 365–368 of diplex filters 360–363. The return paths 320–323 pass through single pole single throw return gates 350–353. Each gate 350–353 opens and closes to accomplish the time division multiplexed return path scheme at the timing direction of timing circuit 230 as delivered by timing control leads 310–313. The return paths 320–323 and return transmitter lead 251 are joined into a single return path 120 by way of directional coupler 315. Return path 120 rejoins forward path 121 in bidirectional communication path 106 by way of low-pass filter 204 of the diplex filter 202. Timing circuit 230, data receiver 220, microprocessor 240, and return transmitter 250 serve the same purpose and function in the same manner as illustrated and described in FIG. 2 except that the isolation of the return gates 350–353 cannot be tested by the return transmitter 250 in the illustrated configuration unless a return transmitter 250 lead is connected to each return gate 350–353.

The advantage of return gate 170 is that each remote point 104 and 295–297 has a dedicated return gate 350–353 to better isolate each remote point individually. Additional advantages include, but are not limited to, shared power supply for multiple forward gates and return gates, shared housing shared gate control components 220, 230, 240, and 250, and forward path connect/disconnect gates 330–333. An example of another circuit function that can be included in a shared housing is an interdiction device that can be used to deny service on forward path carriers by jamming the carriers with RF energy.

Figure 4:
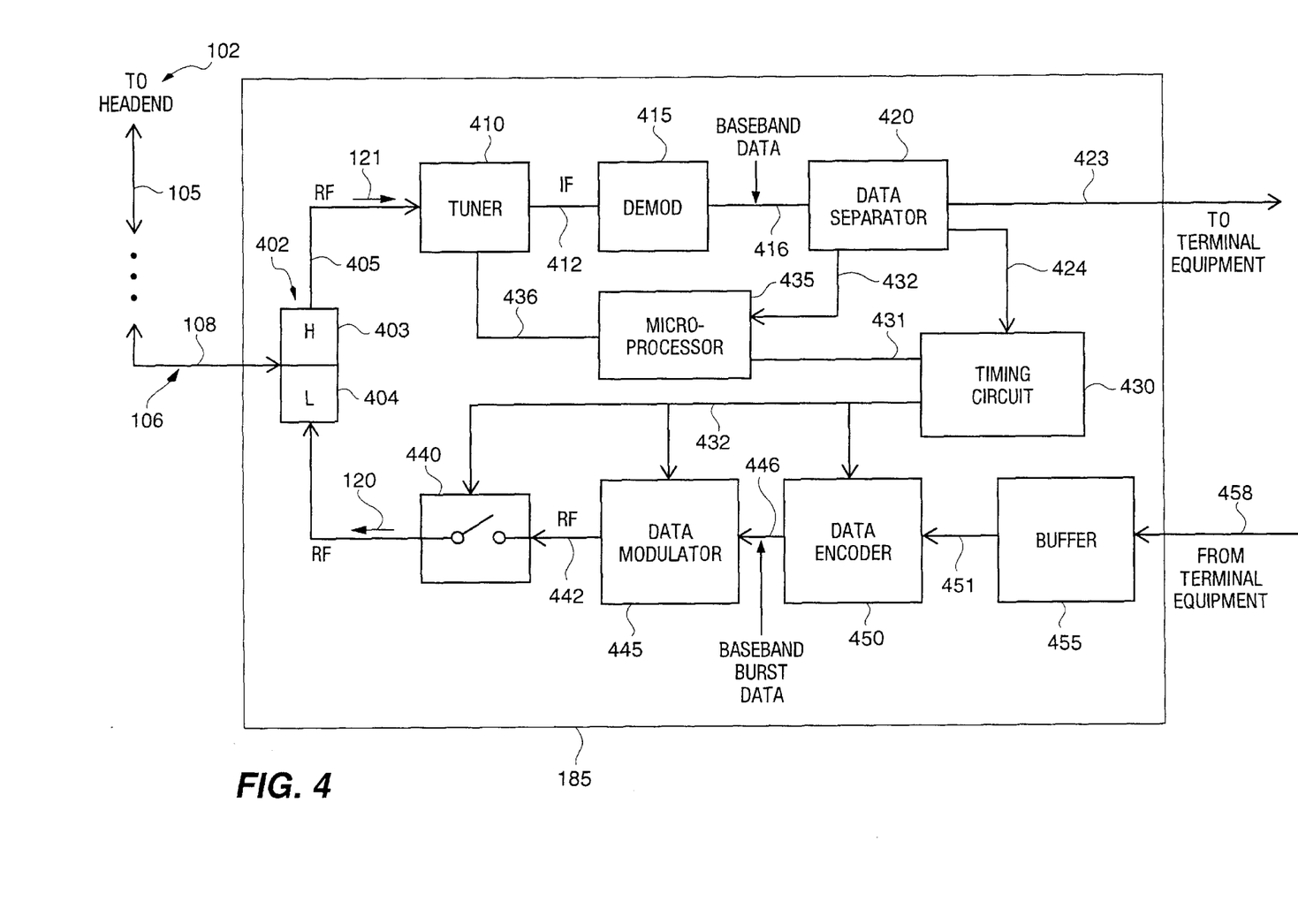
FIG. 4 illustrates a Network Interface Device at a remote point in block diagram form.

Network Interface Device—FIG. 4

FIG. 4 illustrates a Network Interface Device (NID) such as NID 185 previously illustrated within remote point device 104 of FIG. 1. Drop line 108 connects NID 185 to headend 102 by way of the bidirectional communication path 106 structure previously described. NID 185 is also connected to the user/subscriber's terminal equipment by way of forward path 423 and return path 458.

The forward path 121 portion of drop line 108 is separated from drop line 108 by high-pass filter 403 of the diplex filter 402. RF output 405 from high-pass filter 403 is the input to tuner 410. Tuner 410 locks onto the predetermined RF frequency band intended for use by the particular type of terminal equipment attached to NID 185, and converts the RF input to an intermediate frequency (IF) output 412 under the control of microprocessor 435. Microprocessor 435 is connected to tuner 410 by way of microprocessor control lead 436. Additional tuner 410 functions besides frequency conversion include, but are not limited to, filtering the digital data carrier of forward path 121, and providing automatic gain control of the IF output 412.

IF output 412 is demodulated by demodulator 415 to extract the data from the IF carrier frequency. Baseband data 416 from demodulator 415 is separated into timing and forward path data components by data separator 420. The forward path data component output from data separator 420 is delivered to the attached terminal equipment by way of forward path data lead 423. The user/subscriber's terminal equipment may also receive a clock reference from data separator 420 if desired. The timing component output from data separator 420 is delivered to timing circuit 430 by way of timing input lead 424. Timing circuit 430 receives timing and general control information from microprocessor 435 by way of microprocessor control lead 431. Timing circuit 430 directs the data modulation by data encoder 450 and anti-babble gate 440 in synchronization with the time division multiplexed return path gates previously described and illustrated in FIG. 2 and 3. Microprocessor 435 contains the operating system that controls all components and activities of the NID 185. Specific microprocessor 435 functions include, but are not limited to, managing data addressed to the remote point, responding to headend 102 commands, and taking actions based on the status of the network 100 generally and the NID 185 specifically.

Return path data from a user/subscriber's terminal equipment is delivered to NID 185 by way of return path data lead 458. The return path data is buffered in data buffer 455 until a data block is available for encoding by data encoder 450. Buffer output 451 is input to data encoder 450 to randomize the data as baseband burst data for transmission to headend 102. Encoder output 446 is a baseband signal that is modulated onto the appropriate carrier frequency by data modulator 445. Data modulator 445 also adjusts the return path transmission power levels under command of the headend 102. RF output 442 from data modulator 445 can be optionally regulated by anti-babble switch 440 subject to timing control from timing circuit 430 over timing control lead 432. Switch 440 is optional so that the return path is open in the event NID 185 fails to control return path transmissions. Return path output 120 from anti-babble switch 440 joined with the forward path 121 of the bidirectional communication path 106 by way of low-pass filter 404 of the diplex filter 402.

Figure 5:
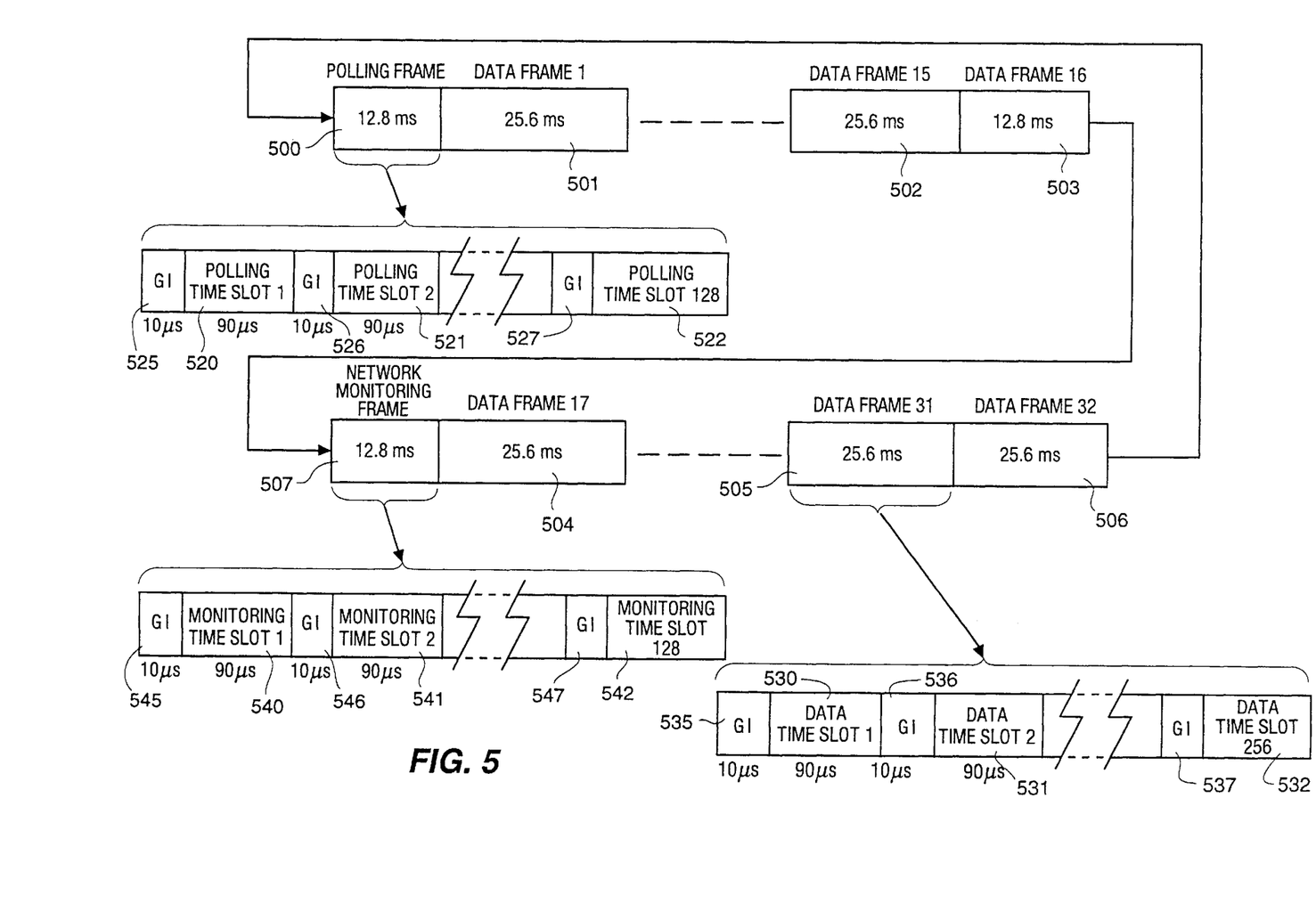
FIG. 5 illustrates a time slot format used for transmitting a return path signal.

Time Division Multiplexing Format—FIG. 5

FIG. 5 illustrates the time slot format used by the return path transmissions from each remote point in the bidirectional cable network 100. The present implementation functions in a manner that provides an apparent point-to-point connection between each remote point and the headend 102 by respecting the time slot timing and transmission requirements of Nyquist's theorem for data and interval rates. This implementation is designed to control 128 return gate devices and to have 256 cyclically reoccurring time slots, although these numbers may be varied by command from the forward channel. The time slot format of the present invention includes a plurality of timing frames 500–507 divided by frame type. The frame types include at least one polling frame 500, a plurality of data frames 501–506, and one or more optional network monitoring frames 507.

A polling frame 500 in the present example is a 12.8 ms frame containing 128 polling time slots 520–522 that are each 90 $\mu$s long and are separated by 10 $\mu$s guard intervals 525–527. Polling time slots are used by each of up to 128 remote points to communicate service requests such as to request a data time slot assignment or to transmit a packet of data. If no requests are being transmitted to the headend 102, the headend 102 can use the polling time slots to listen for noise or other undesirable energy m the network. Because the headend 102 knows which remote point is assigned to which polling time slot, the beadend 102 can determine the origin of the undesirable energy in the network. Another use of the polling time slots is to piggy back a service request with a packet of data of a sufficiently small quantity to permit complete transmission within the assigned polling time slot, such as to pause, fast forward, or rewind a pay per view movie, or to choose from a menu.

A data frame 505 in the present example is a 25.6 ms frame containing 256 data time slots 530–532 that are each 90 $\mu$s long and are separated by 10 $\mu$s guard intervals 535–537. Data time slots are used by each remote point to communicate data associated with a service request or any other interactive or bidirectional communication required by the user/subscriber and may be used to operate a continuous stream of return data. Data time slots 530–532 are not modulation specific and can accommodate any modulation inside a Time Division Multiple Access (TDMA) scheme. Other modulation types include, but are not limited to, Orthogonal Frequency Division Multiplexing (OFDM), Code Division Multiple Access (CDMA), Quadentairy Phase Shift-Keying (QPSK) or other Frequency Shift-Keying (FSK), and Ghost Canceling Reference or Training Signaling (GCR). These modulation types can be sent concurrently if desired.

Optional network monitoring fame 507 in the present example is a 12.8 ms frame containing 128 monitoring time slots 540–542 that are each 90 $\mu$s long and are separated by 10 $\mu$s guard intervals 545–547. If network monitoring time slots are implemented, they are used by the headend 102 to monitor each remote point for undesirable energy on the network. However, because noise and other undesirable energy can be intermittent for burst lengths that are shorter than the cycle time of the monitoring frame, the interference may not be discovered immediately. For this reason the monitoring time frame 507 may be used in conjunction with the polling frame monitoring technique discussed previously. One monitoring time slot may be used with all 256 return gates blocked to check for ingress or other problems into the "clean" part of the network. Note that multiple data time slots may be assigned to one return gate distribution branch, and one NID may use multiple time slots.

Figure 6:
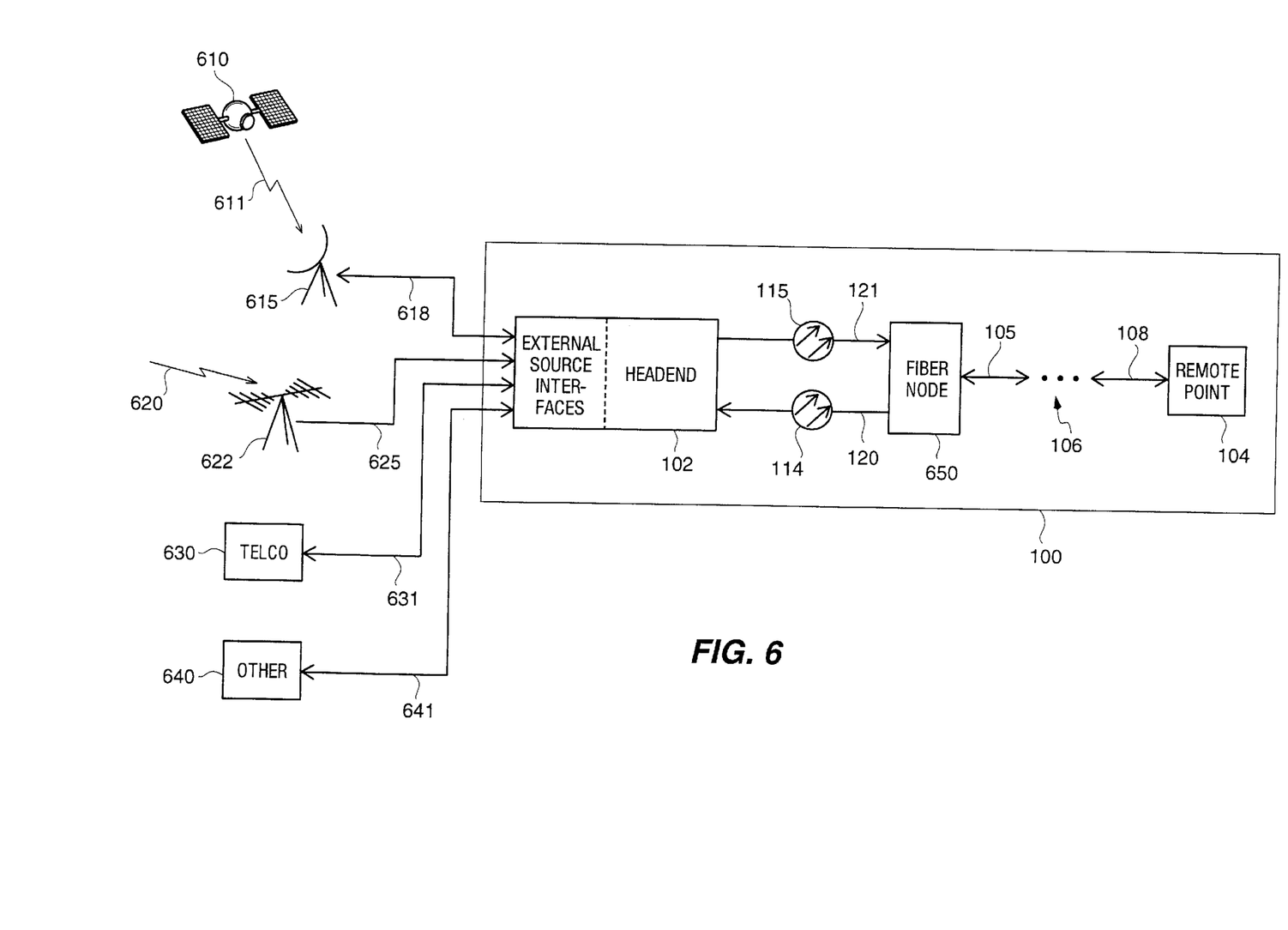
FIGS. 6–7 illustrate headend details in block diagram form.
Figure 7:
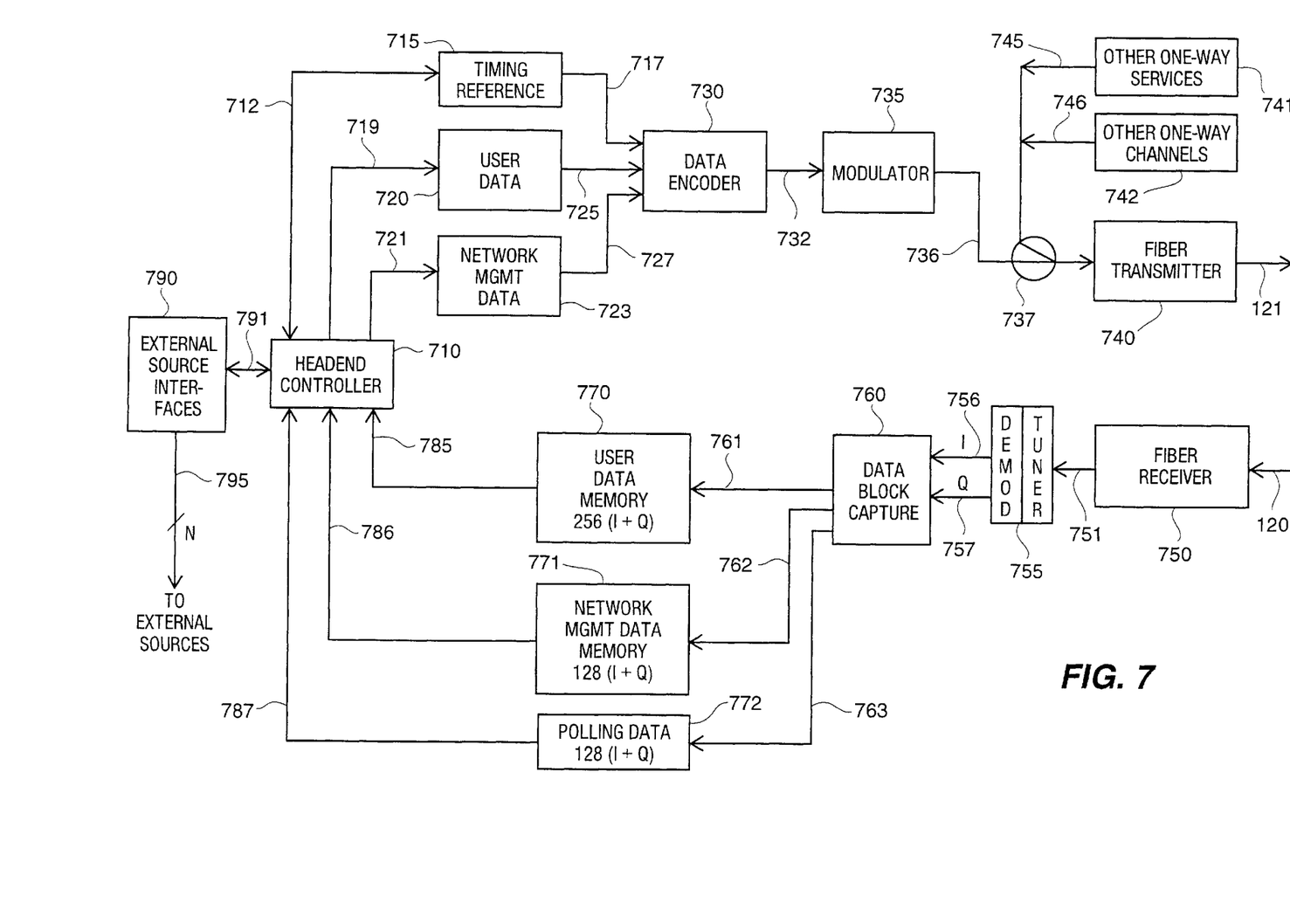

Headend Details—FIG. 6–7

FIG. 6 illustrates the headend 102 portion of bidirectional cable network 100. Headend 102 is the origination/collection point for forward path 121 signals and the termination/collection point for return path 120 signals to and from remote point 104. Headend 102 is also the interface for transmitting and receiving data to and from data sources external to bidirectional cable network 100 in a manner well known and practiced in the cable industry. Bidirectional cable network 100 activities and configurations between headend 102 and remote point 104 are the same in FIG. 6 as previously described and illustrated in FIG. 1–5. Data sources external to bidirectional cable network 102 include, but are not limited to, satellite transmission 611 from satellite 610 by way of satellite antenna 615 and satellite lead 618, radio wave transmission 620 delivered by way of radio wave antenna 622 and radio wave lead 625, telephone company central office switch 630 by way of telephone lead 631, and other external sources 640 by way of external lead 641.

FIG. 7 illustrates the headend 102 details for managing bidirectional cable network 100. Headend controller 710 receives data from external sources from external source interfaces 790 by way of external source bus 791. Headend controller 710 outputs the external source data on output data lead 719 to user data staging area 720. Headend controller 710 coordinates network timing with timing reference 715 by way of communication lead 712. Timing reference 715 can be any type of high precision oscillator such as a crystal oscillator that is required to achieve any level of network accuracy. Headend controller 710 also coordinates all network management data required to operate or maintain the network. The network management data is output to network management data staging area 723 by way of network management data lead 721.

Data encoder 730 accepts input from timing reference 715, user data staging area 720, and network management data staging area 723 and encodes the data for transmission on a forward path carrier. The time slots are assigned by the headend controller 710 and generated by the data encoder 730. Encoded baseband data is output on encoder output 732 to modulator 735 for modulation of the encoded baseband data onto a carrier frequency. The modulated carrier frequency output 736 is output on modulation output lead 736 for transmission by fiber optic laser transmitter 740 onto the forward path 121 into the bidirectional cable network 100. Additional one way carriers 741 and one way channels 742 are output on leads 745–746 for joining with modulated output lead 736 by way of directional coupler 737. Types of one-way services 741 include, but are not limited to, digital music and computer games. Types of one-way channels 742 include, but are not limited to, analog or digital television channels. Carriers may occupy a 6 MHz channel or they may occupy a non-standard bandwidth.

Return path 120 signals are received by fiber optic laser receiver 750 and output on receiver output lead 751 to tuner/demodulator 755. The tuner filters the return path signal, adjusts the gain. The demodulator samples the data from specific burst transmissions and converts each signal into its In-phase and Quadrature (I&Q) components. The I&Q components are separately output on I&Q leads 756 and 757. Data block capture buffer 760 collects return path burst signals. User data I&Q is output into 256 blocks of user data I&Q memory 770 by way of user data lead 761. Network management I&Q data and network polling I&Q data are output on I&Q data leads 762–763 to respective I&Q data memory 771 and 772 into 128 blocks. User I&Q 770, network management I&Q 771, and polling I&Q 772, are output on leads 785–787 to the headend controller 710 for signal processing, error correction, and separation of guard intervals from time slot information. User data on user data lead 785 is delivered to the appropriate external source interface 790 by way of external source bus 791. External source interfaces 790 each have the ability to interface with unique external sources and external source output leads 795 are used as needed to connect to necessary transmission equipment required by each external source.

Among the important network management and maintenance tasks performed by the headend controller 710 and transmitted through the network as network management data on forward data carriers includes, but is not limited to, identifying problem points in the network, performing ranging functions, connecting and disconnecting subscriber service, house-keeping administrative functions, power level monitoring, and general status monitoring for points throughout the network. Ranging functions are particularly important because a forward path signal is sent to each remote point and the remote point response delay is timed. The delay for a signal to reach and return from the furthest remote point, is added to the progressively nearer remote points so that time division multiplexing timing is consistent at the headend receiver.

Figure 8:
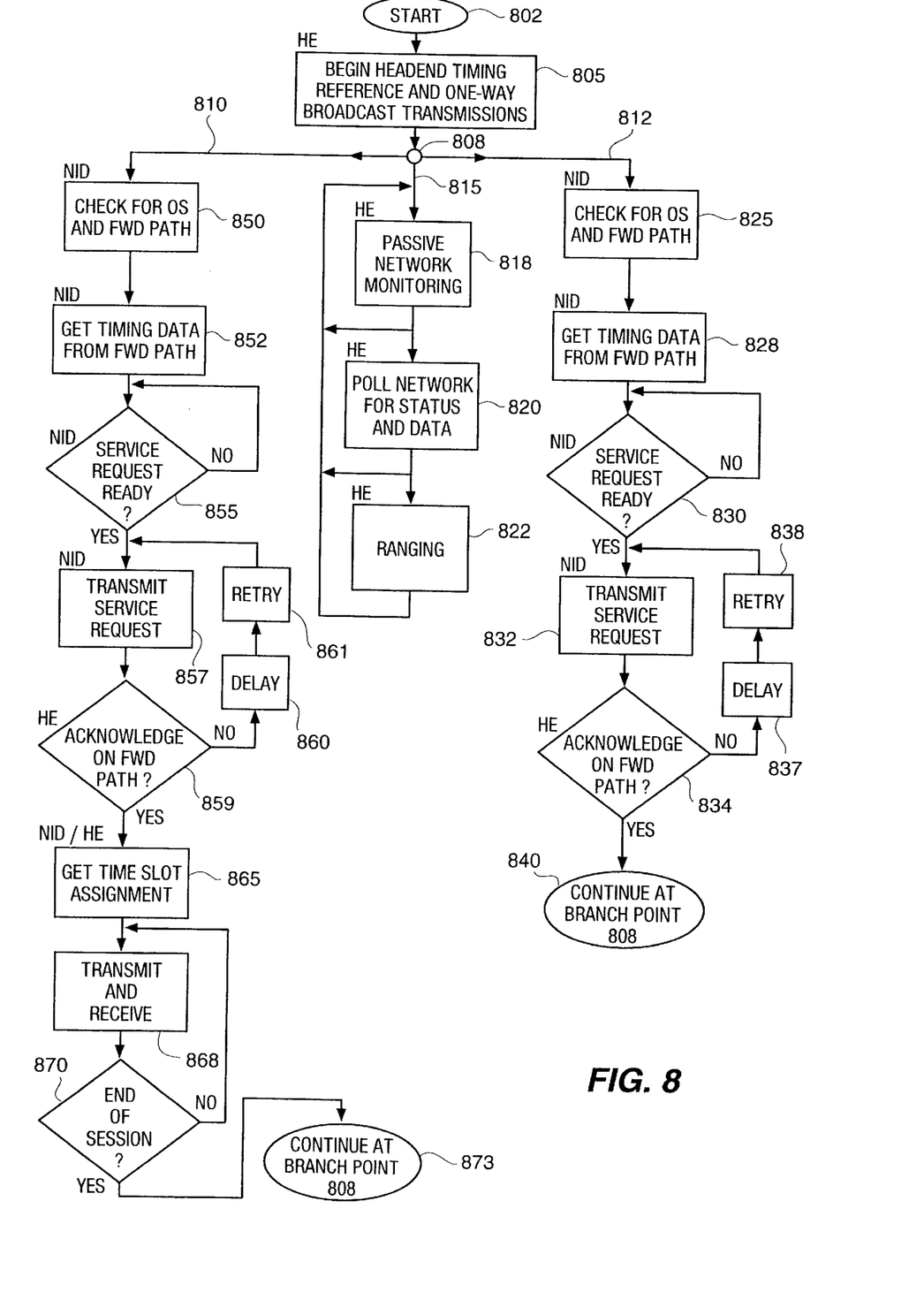
FIG. 8 illustrates signal distribution system operational steps in flow diagram form.

Signal Distribution System Operational Flow—FIG. 8

FIG. 8 illustrates an operational flow diagram example of a bidirectional cable network 100 using a return gate time division multiplexed signal distribution system. Each step in FIG. 8 is accompanied by a two or three letter identifier indicating the network component primarily responsible for performing the step. For example, HE identifies the headend, RG identifies the return gate, and NID identifies a network interface devices in a remote point. As a general matter it is important to appreciate that the bidirectional cable network 100 as a whole is a continually evolving system that has no readily identifiable start or finish. For this reason, the FIG. 8 flow diagram begins at step 802 with the understanding that the headend has already defined the time slot format previously illustrated and discussed with FIG. 5.

Bidirectional cable network 100 continuously broadcasts a timing reference at step 805 for use by any remote point, return gate, or other network component requiring time synchronization. A return gate uses the timing reference to know when to open and close its return path gate at the occurrence of each return path time slot for each remote point within that return gate's domain. A remote point uses the timing reference to know when to transmit on the return path time slot previously assigned by the headend.

The headend of bidirectional cable network 100 also continuously broadcasts a plurality of one-way broadcast signals at step 805 on predetermined bands of the high frequency forward path. The one-way broadcast signals on the forward path are not addressed to any one remote point so that they are available for reception by each return gate device and any remote point. Examples of one-way broadcast signals include, but are not limited to, digital radio channels, and television viewing channels such as the Cable News Network (CNN) channel. A return gate uses the forward path broadcast signal to extract time slot assignment information addressed to remote points within the return gate's device distribution branch. A remote point uses the forward path broadcast signal to receive any frequency band of the non-addressed broadcast in addition to receiving time slot assignment and substantive data specifically addressed to the remote point.

Branch point 808 identifies three flow diagram branches for three primary time division multiplexed activities that occur in bidirectional cable network 100. The major branches include, but are not limited to, the status and network maintenance branch 815, the low-priority service request branch 812, and the high-priority fully interactive service request and response branch 810.

The status and network maintenance branch 815 includes steps primarily performed by the headend and not necessarily in the order illustrated. The headend performs passive network monitoring at step 818 by listening for undesirable energy in unused polling and/or data time slots assigned to each remote point Because the headend knows which remote point is assigned to which time slot, troublesome remote points are easily identified. Passive network monitoring is a continuous process whether the operational flow of the FIG. 8 flow diagram is followed to step 820 or returned to branch point 808. The headend can also poll the network for status or other data at step 820 by way of polling time slots and/or network monitoring time slots. Status received by the headend in response to polling the network includes, but is not limited to, remote point and return gate device power status, undesirable energy in the network generally, and operational status of each remote point and return gate device. Data received by the headend in response to polling the network includes, but is not limited to, signal strength levels, return gate device alarms, temperature levels, and voltage levels. Network polling can occur in real time during the network polling time slots or during slack time at night when network traffic is low. However, network monitoring is typically a continuous process whether the operational flow of the FIG. 8 flow diagram is followed to step 822 or returned to branch point 808.

The headend must perform a ranging on newly installed return gate devices and remote points in the network at step 822. A periodic ranging may be necessary on installed return gate devices and remote points. Ranging is the process of broadcasting a ranging signal across the network and measuring the time required for each return gate and remote point response to reach the headend. The round trip message time is used to determine the physical distance from the headend to each return gate device and remote point Because the remote point furthest the headend requires the most time to send and receive a message through the network, the remote points and return gates nearest the headend are instructed to add a time delay to their time slot access calculation so that each remote point and return gate device knows the precise instant a guard interval or time slot begins and ends regardless of distance of any return gate or remote point from the headend. Ranging and range verifications are continuous processes that occur at least as often as when each new remote point or return gate device is added to the network.

The low-priority service request branch 812 illustrates steps primarily performed by a NID in conjunction with the headend and return path gate management by individual return gate devices along the return path to the headend. Low-priority service requests include, but are not limited to, responses to headend polling requests, on-demand movie selections requests, movie playback commands such as rewind, pause, or fast forward, and other simple service requests where the request and any accompanying data supporting the request can be packaged together in a single service request time slot rather than in separate time slots.

Operationally, the first activity in low-priority service request branch 812 is at step 825 where a NID checks its internal operating status to verify the presence of a functioning operating system and the presence of a forward path carrier signal that indicates viable connectivity to the network. If the NID is not operational or there is no forward path carrier, the NID will record this status and proceed no further in attempting to transmit to the headend until the problems are resolved. If the NID and forward path carrier are operational, the NID updates its timing information by extracting timing data from the forward path at step 828. If the NID does not have a status request ready to transmit to the headend when the time slot occurs at decision step 830, the NID continues cycling until the request is prepared. When the service request is ready to send at decision step 830, processing continues at step 832 where the NID transmits the request in the polling time slot assigned to it by the headend. The time slot assignment was previously delivered by way of the forward path so that the NID knows when to transmit in what time slot and the upstream return gate devices from the NID know when to open and close the return gate for the assigned time slot.

If the transmission from the NID was not successful at decision step 834 due to a time slot collision or other transmission problem, the NID delays retransmission temporarily at step 837 and prepares for retransmission at step 838. The retransmission occurs at step 832 in concert with the return gate opening and closing at the occurrence of the assigned time slot. If the NID's transmission is received by the headend and successfully acknowledged by the headend at decision step 834, processing is complete at step 840 and can continue at branch point 808.

The high-priority fully interactive service request and response branch 810 illustrates the operational steps involved in implementing a bidirectional communication for activities including, but not limited to, interactive games, home shopping systems, video library selections, internet session activities, telephone connections and conversations, and virtual CD-ROM search sessions. Common to each of the above mentioned services is that a service request and the accompanying data for the request require individual time slots. In addition, the headend's response to a request is delivered as an addressed message on the forward path. This means that all NIDs and return gate devices in the network will see the addressed response and every NID and return gate device will ignore the response except for the NID to whom the response is addressed.

Operationally, the first activity in high-priority fully interactive service request branch 810 is at step 850 where a NID checks its internal operating status to verify the presence of a functioning operating system and the presence of a forward path carrier signal that indicates viable connectivity to the network If the NID is not operational or there is no forward path carrier, the NID will record this status and proceed no further in attempting to transmit to the headend until the problems are resolved. If the NID and forward path carrier are operational, the NID updates its timing information by extracting data from the forward path at step 852. If the NID does not have a service request ready to transmit to the headend when the time slot occurs at decision step 855, the NID continues cycling until the request is prepared. When the request is ready to send at decision step 855, processing continues at step 857 where the NID transmits the request in a polling time slot assigned to it by the headend. The time slot assignment was previously transmitted by way of the forward path so that the NID knows when to transmit and in what time slot, and the upstream return gate devices from the NID know when to open and close the return gate for the assigned time slot.

If the transmission is not successful at decision step 859 due to a time slot collision or other transmission problem, the retransmission is delayed temporarily at step 860. The retransmission is prepared at step 861 and transmitted at step 857. If the retransmission is successful at decision step 859, a data time slot is assigned by the headend and the assignment is broadcast on the forward path so that both the NID in the remote point and the return gate devices having a distribution branch containing the remote point, are aware of the assigned time slot. When the time slot occurs, the NID will transmit data while the return gate closes the gate for the duration of the time slot, thereby providing a return path for the transmission. The headend and remote point then begin transmitting and receiving data at step 868 to the extent required to complete the bidirectional interactive exchange. When the exchange is complete at decision step 870, processing proceeds to step 873 where the processing returns to branch point 808.

SUMMARY

This invention relates to a bidirectional cable network having a signal distribution system that suppresses undesirable energy in the network's return path from adversely affecting the entire network. Components necessary to implement the bidirectional cable network as disclosed herein, are individually known and widely available in the cable industry from manufacturer/distributors including, but not limited to, General Instruments, Phillips Broadband, Eagle, and Scientific Atlanta.

What is claimed is:

1. A bidirectional cable network system for enabling bidirectional signal exchanges in a network having a bidirectional communication path between a headend signal source and a plurality of remote points, said system comprising:

first means for enabling said plurality of remote points to receive a first signal transmitted in a first direction over said bidirectional communication path from said headend to said plurality of remote points;

means for defining a series of cyclically reoccurring time slots for use on said bidirectional communication path between said headend and said plurality of remote points;

at least one return gate located in a second direction of said bidirectional communication path to connect and disconnect said second direction of said bidirectional communication path in concert with any one of said series of cyclically reoccurring time slots on behalf of any of said plurality of remote points that are downstream from said at least one return gate;

means for requesting an assignment of at least one of said series of cyclically reoccurring time slots at will by any of said plurality of remote points;

means for dynamically assigning at least one of said series of cyclically reoccurring time slots in real time to said requesting one of said plurality of remote points;

second means for enabling said requesting one of said plurality of remote points to transmit in said second direction to said headend during an occurrence of each of said at least one of said series of cyclically reoccurring time slots to which said requesting one of said plurality of remote points is assigned; and means for engaging each of said at least one return gate independent of said headend to disconnect said second direction of said bidirectional communication path by way of each of said at least one return gate at all times except to connect said second direction of said bidirectional communication path by each of said at least one return gate that is in an upstream path from said requesting one of said plurality of remote points during an occurrence of each of said series of cyclically reoccurring time slots to which said requesting one of said plurality of remote points is assigned.

2. A signal distribution system according to claim 1 including:

third means for enabling said plurality of remote points and said at least one return gate to concurrently and continuously receive said first signal transmitted in said first direction.

3. A signal distribution system according to claim 1 wherein said means for defining said series of cyclically reoccurring time slots includes:

means for defining a series of frames comprising:

at least one polling frame containing a plurality of polling time slots individually corresponding to each of said plurality of remote points for transmitting a service initiation request from said plurality of remote points to said headend and for transmitting a service termination signal from said headend to any one of said plurality of remote points;

a plurality of data frames each containing a plurality of data time slots for transmitting said return signal in said second direction from any one of said plurality of remote points to said headend; and means for defining a guard interval between each of said plurality of polling time slots and said plurality of data time slots.

4. A signal distribution system according to claim 3 wherein said means for defining said series of cyclically reoccurring time slots includes:

at least one network monitoring frame containing a plurality of path monitoring time slots individually corresponding to each of said plurality of remote points for monitoring each of said plurality of remote points for undesirable energy on said bidirectional communication path.

5. A signal distribution system according to claim 3 wherein said at least one polling frame includes:

said service initiation request accompanied with data for said service initiation request embedded therein.

6. A signal distribution system according to claim 1 wherein said means for assigning includes:

means for assigning said series of cyclically reoccurring time slots in real time where time slot assignment data is extracted from said first signal being transmitted in said first direction.

7. A signal distribution system according to claim 1 wherein said means for engaging includes:

at least one primary return gate with no other return gate between itself and at least one of said plurality of remote points on a distribution branch of said bidirectional communication path and at least one secondary return gate in series with said primary return gate between said primary return gate and said headend; and means for synchronizing said at least one primary return gate and said at least one secondary return gate with said headend and each of said plurality of remote points based on said first signal transmitted in said first direction as a timing reference.

8. A signal distribution system according to claim 7 wherein:

an individual one of said at least one primary return gate serves at least two of said plurality of remote points on said distribution branch.

9. A signal distribution system according to claim 7 wherein said at lest one primary return gate includes:

only one of said at least one primary return gate being dedicated to a corresponding one of said plurality of remote points on said distribution branch.

10. A signal distribution system according to claim 1 including:

means for disconnecting an individual one of said plurality of remote points from said first direction of said bidirectional communication path; and means for reconnecting said individual one of said plurality of remote points to said first direction of said bidirectional communication path.

11. A signal distribution system according to claim 1 further including:

means for testing isolation of said return gate on said second direction of said bidirectional communication path.

12. A method for use in a bidirectional cable network system for enabling bidirectional signal exchanges in a network having a bidirectional communication path between a headend signal source and a plurality of remote points, said method comprising the steps of:

first step of enabling said plurality of remote points to receive a first signal transmitted in a first direction over said bidirectional communication path from said headend to said plurality of remote points;

defining a series of cyclically reoccurring time slots for use on said bidirectional communication path between said headend and said plurality of remote points;

locating at least one return gate located in a second direction of said communication path to connect and disconnect said second direction of said bidirectional communication path in concert with any one of said series of cyclically reoccurring time slots on behalf of any of said plurality of remote points that are downstream from said at least one return gate;

requesting an assignment of at least one of said series of cyclically reoccurring time slots at will by any of said plurality of remote points;

dynamically assigning at least one of said series of cyclically reoccurring time slots in real time to said requesting one of said plurality of remote points;

second step of enabling said requesting one of said plurality of remote points to transmit in said second direction to said headend during an occurrence of each of said at least one of said series of cyclically reoccurring time slots to which said requesting one of said plurality of remote points is assigned; and engaging each of said at least one return gate independent of said headend to disconnect said second direction of said bidirectional communication path by way of each of said at least one return gate at all times except to connect said second direction of said bidirectional communication path by each of said at least one return gate that is in an upstream path from said requesting one of said plurality of remote points during an occurrence of each of said series of cyclically reoccurring time slots to which said requesting one of said plurality of remote points is assigned.

13. A method according to claim 12 including:

third step of enabling said plurality of remote points and said at least one return gate to concurrently and continuously receive said first signal transmitted in said first direction.

14. A method according to claim 12 wherein said step of defining said series of cyclically reoccurring time slots includes:

defining a series of frames comprising:

at least one polling frame containing a plurality of polling time slots individually corresponding to each of said plurality of remote points for transmitting a service initiation request from said plurality of remote points to said headend and for transmitting a service termination signal from said headend to any one of said plurality of remote points;

a plurality of data frames each containing a plurality of data time slots for transmitting said return signal in said second direction from any one of said plurality of remote points to said headend; and defining a guard interval between each of said plurality of polling time slots and said plurality of data time slots.

15. A method according to claim 14 wherein said step of defining said series of cyclically reoccurring time slots includes:

at least one network monitoring frame containing a plurality of path monitoring time slots individually corresponding to each of said plurality of remote points for monitoring each of said plurality of remote points for undesirable energy on said bidirectional communication path.

16. A method according to claim 14 wherein said at least one polling frame includes:

said service initiation request accompanied with data for said service initiation request embedded therein.

17. A method according to claim 12 wherein said step of assigning includes:

assigning said series of cyclically reoccurring time slots in real time wherein time slot assignment data is extracted from said first signal being transmitted in said first direction.

18. A method according to claim 12 wherein said step of engaging includes:

operating at least one primary return gate with no other return gate between itself and at least one of said plurality of remote points on a distribution branch of said bidirectional communication path and at least one secondary return gate in series with said primary return gate between said primary return gate and said headend; and synchronizing said at least one primary return gate and said at least one secondary return gate with said headend and each of said plurality of remote points based on said first signal being transmitted in said first direction as a timing reference.

19. A method according to claim 18 wherein said step of operating said at least one primary return gate includes:

serving a plurality of said plurality of remote points with an individual one of said at least one primary return gate on said distribution branch.

20. A method according to claim 18 wherein said step of operating said at least one primary return gate includes:

serving each one of said plurality of remote points with a corresponding dedicated one of said at least one primary return gate on said distribution branch.

21. A method according to claim 12 including:

disconnecting an individual one of said plurality of remote points from said first direction of said bidirectional communication path; and reconnecting said individual one of said plurality of remote points to said first direction of said bidirectional communication path.

22. A method according to claim 12 further including:

testing isolation of said return gate on said second direction of said bidirectional communication path.

23. A system to protect a bidirectional cable network from having undesirable energy uncontrollably propagate along a return path between a plurality of remote points and a headend in said bidirectional cable network, said bidirectional cable network having a bidirectional communication path and tree type trunk and branch configuration, said system comprising:

means for defining a series of cyclically reoccurring time slots for use on said bidirectional communication path between said headend and said plurality of remote points;

means for requesting an assignment of at least one of said series of cyclically reoccurring time slots at will by any of said plurality of remote points;

means for dynamically assigning at least one of said series of cyclically reoccurring time slots in real time to said requesting one of said plurality of remote points;

a plurality of intelligent return gates to connect and disconnect said return path of said plurality of remote points on a distribution branch of said bidirectional cable network in concert with dynamically assigned ones of said series of cyclically reoccurring time slot; and means for disconnecting said return path independent of any time slot assignments by way of any one of said plurality of return gates of said distribution branch to isolate a specific downstream section of said distribution branch and specific downstream ones of said plurality of remote points from access to a clean part of said bidirectional cable network.

24. A system according to claim 23 wherein at least one of said plurality of return gates serves at least two of said plurality of remote points on said distribution branch of said bidirectional communication path.

25. A system according to claim 23 wherein each one of said plurality of remote points has a primary return gate dedicated thereto.

\* \* \* \* \*